(12) United States Patent
Lee et al.

(10) Patent No.: US 9,904,087 B2
(45) Date of Patent: Feb. 27, 2018

(54) LIQUID CRYSTAL DISPLAY

(71) Applicant: Samsung Display Co., Ltd., Yongin-si, Gyeonggi-do (KR)

(72) Inventors: Sun Hwa Lee, Yongin-si (KR); Kwang-Chul Jung, Seongnam-si (KR); Il Gon Kim, Seoul (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 15/158,212

(22) Filed: May 18, 2016

(65) Prior Publication Data

US 2017/0115523 A1 Apr. 27, 2017

(30) Foreign Application Priority Data

Oct. 22, 2015 (KR) .................. 10-2015-0147612

(51) Int. Cl.
*G02F 1/1343* (2006.01)
*G02F 1/1333* (2006.01)
*G02F 1/1339* (2006.01)
*G02F 1/1335* (2006.01)
*G02F 1/1368* (2006.01)
*G02F 1/1362* (2006.01)

(52) U.S. Cl.
CPC ...... *G02F 1/133377* (2013.01); *G02F 1/1368* (2013.01); *G02F 1/13439* (2013.01); *G02F 1/133514* (2013.01); *G02F 1/134309* (2013.01); *G02F 1/136286* (2013.01); *G02F 1/136209* (2013.01); *G02F 2001/134345* (2013.01); *G02F 2001/136218* (2013.01)

(58) Field of Classification Search
CPC ................................. G02F 1/133377
See application file for complete search history.

(56) References Cited

U.S. PATENT DOCUMENTS

2013/0321734 A1* 12/2013 Won .............. G02F 1/136286
349/43
2015/0138479 A1 5/2015 Lee et al.

FOREIGN PATENT DOCUMENTS

| JP | 2015-036817 A | 2/2015 |
|---|---|---|
| KR | 10-2005-0000653 A | 1/2005 |
| KR | 10-2013-0084842 A | 7/2013 |
| KR | 10-2015-0014197 A | 2/2015 |

* cited by examiner

*Primary Examiner* — Wen-Ying P Chen
(74) *Attorney, Agent, or Firm* — Innovation Counsel LLP (57) ABSTRACT

A liquid crystal display according to an exemplary embodiment of the present disclosure includes: a substrate; a pixel electrode disposed on the substrate; a roof layer facing the pixel electrode; a liquid crystal layer disposed in a plurality of microcavities between the pixel electrode and the roof layer; a partition disposed between adjacent microcavities among the plurality of microcavities; and a shielding electrode disposed between the substrate and the partition, wherein the shielding electrode is disposed on the same layer as the pixel electrode.

18 Claims, 9 Drawing Sheets

LIQUID CRYSTAL DISPLAY

CROSS-REFERENCE TO RELATED APPLICATION

This application claims priority to and the benefit of Korean Patent Application No. 10-2015-0147612 filed in the Korean Intellectual Property Office on Oct. 22, 2015, the entire contents of which are incorporated herein by reference.

BACKGROUND (a) Field

The present disclosure relates to a liquid crystal display.

(b) Description of the Related Art

A liquid crystal display is one of display devices that are widely used, and generally includes two substrates and a liquid crystal layer interposed therebetween.

The liquid crystal display displays an image by generating an electric field on a liquid crystal layer by applying a voltage to the electrodes disposed in the display panel including the substrate, determining alignments of liquid crystal molecules included in the liquid crystal layer, and controlling polarization of incident light.

As one among the liquid crystal displays, a technique realizing the display by forming a plurality of microcavities and injecting the liquid crystal material therein to form the liquid crystal layer has been developed. Unlike conventional liquid crystal displays which use two opposing substrates, this technique may reduce weight, thickness, and the like thereof by forming the liquid crystal displays on one substrate.

However, in the process forming the pixel electrode and the common electrode to generate the electric field on the liquid crystal layer, if the pixel electrode and the common electrode are misaligned, the liquid crystal capacitance may be changed.

The above information disclosed in this Background section is only for enhancement of understanding of the background of the disclosure and therefore it may contain information that does not form the prior art that is already known in this country to a person of ordinary skill in the art.

SUMMARY

Accordingly, the present disclosure provides a liquid crystal display reducing the change amount of the liquid crystal capacitance.

A liquid crystal display according to an exemplary embodiment of the present disclosure includes: a substrate; a pixel electrode disposed on the substrate; a roof layer facing the pixel electrode; a liquid crystal layer disposed in a plurality of microcavities between the pixel electrode and the roof layer; a partition disposed between adjacent microcavities among the plurality of microcavities; and a shielding electrode disposed between adjacent pixel electrodes, wherein the shielding electrode is disposed on the same layer as the pixel electrode.

The liquid crystal display may further include a common electrode disposed along one surface of the roof layer and the partition protruded toward the liquid crystal layer.

The common electrode may be disposed between a lower surface of the partition and the shielding electrode.

The width of the shielding electrode may be larger than the width of the common electrode contacting the shielding electrode.

The common electrode may contact the shielding electrode.

The partition may include the same material as the roof layer.

The partition may include a color filter.

The pixel electrode may include a first sub-pixel electrode and a second sub-pixel electrode, the shielding electrode may include a first shielding electrode adjacent to the first sub-pixel electrode and a second shielding electrode adjacent to the second sub-pixel electrode, and the width of the first shielding electrode may be different from that of the second shielding electrode.

The liquid crystal display may further include: a data line disposed on the substrate; and a first storage electrode line and a second storage electrode line disposed on a left side and a right side of the data line, respectively, wherein widths of the first storage electrode line and the second storage electrode line may be different from each other.

A liquid crystal display according to an exemplary embodiment of the present disclosure includes: a substrate; a roof layer facing the substrate; a liquid crystal layer disposed in a plurality of microcavities between the substrate and the roof layer; a partition disposed between adjacent microcavities among the plurality of microcavities; and a shielding electrode disposed between adjacent pixel electrodes, wherein a width of the shielding electrode is larger than the width of the lower surface of the partition.

The liquid crystal display may further include a common electrode disposed along one surface of the roof layer and the partition protruded toward the liquid crystal layer.

The common electrode may be disposed between the lower surface of the partition and the shielding electrode.

The common electrode may contact the shielding electrode.

The width of the shielding electrode may be larger than the width of the common electrode contacting the shielding electrode.

The partition includes the same material as the roof layer.

The partition may include a color filter.

The liquid crystal display may include a pixel electrode disposed on the substrate and including a first sub-pixel electrode and a second sub-pixel electrode, the shielding electrode may include a first shielding electrode adjacent to the first sub-pixel electrode and a second shielding electrode adjacent to the second sub-pixel electrode, and the width of the first shielding electrode and the width of the second shielding electrode may be different.

The liquid crystal display may include a pixel electrode disposed on the substrate, and the shielding electrode may be on the same layer as the pixel electrode.

The liquid crystal display may include: a data line disposed on the substrate; and a first storage electrode line and a second storage electrode line disposed on a left side and a right side of the data line, wherein widths of the first storage electrode line and the second storage electrode line may be different.

As described above, in the liquid crystal display according to an exemplary embodiment of the present disclosure, even if the arrangement between the pixel electrode and the common electrode is misaligned, the change amount of the liquid crystal capacitance may be reduced.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present disclosure is not limited thereto. In the drawings, the thickness of layers, films, panels, regions, etc., are exaggerated for clarity. In the drawings, for better understanding and ease of description, the thicknesses of some layers and areas are exaggerated.

Also, it will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, the word "on" means positioning on or below the object portion, but does not essentially mean positioning on the upper side of the object portion based on a gravity direction.

In addition, unless explicitly described to the contrary, the word "comprise" and variations such as "comprises" or "comprising" will be understood to imply the inclusion of stated elements but not the exclusion of any other elements.

Further, in the specification, the word "in a plan view" means when an object portion is viewed from above, and the word "in a cross-section" means when a cross-section taken by vertically cutting an object portion is viewed from the side.

Figure 1:
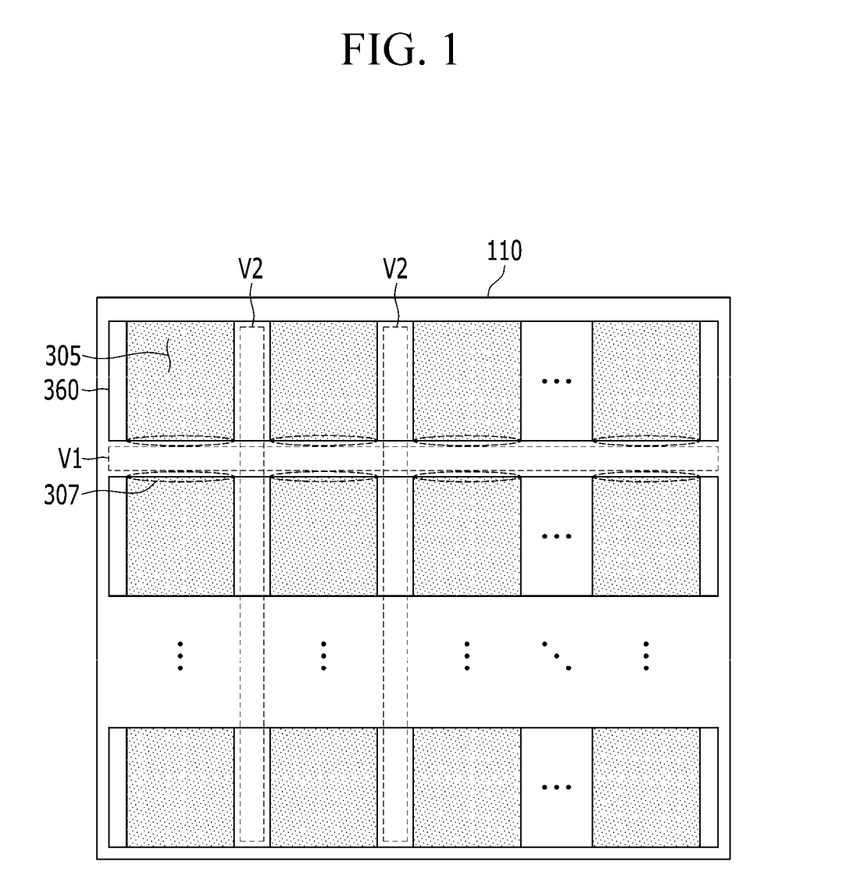
FIG. 1 is a schematic top plan view of a liquid crystal display according to an exemplary embodiment of the present disclosure.

FIG. 1 is a schematic top plan view of a liquid crystal display according to an exemplary embodiment of the present disclosure.

Referring to FIG. 1, a liquid crystal display according to the present exemplary embodiment includes a plurality of microcavities 305 disposed between a substrate 110 and a plurality of roof layers 360. The microcavities 305 are formed in a manufacturing process, and are spaces in which an alignment material and a liquid crystal material are injected to be an alignment layer and a liquid crystal layer that are described later.

A first region V1 is disposed between the roof layers 360 that are vertically adjacent as shown in FIG. 1 among the plurality of roof layers 360, and the roof layer 360 may not exist in the first region V1. The first region V1 may be covered by a capping layer that is described later or the liquid crystal material. An inlet part 307 is formed near the boundary of the first region V1 and the microcavities 305 to inject the alignment material and/or the liquid crystal material into the microcavities 305 before covering the first region V1 by the capping layer or the liquid crystal material. The inlet part 307 is covered by the capping layer or the liquid crystal material in the final structure. The inlet part 307 may be disposed on both edges of the microcavities 305. Here, both edges of the microcavities 305 may be portions facing each other in the direction that the second region V2 extends.

The plurality of roof layers 360 may be respectively elongated in the horizontal direction, and as shown in FIG. 1, a partition that is described later may be disposed in the second region V2 extending in the vertical direction. The partition has a function of defining the microcavities 305 adjacent to each other based on the second region V2. The partition may be a portion where the roof layer 360 is protruded in the direction toward the substrate 110. In other words, the partition may be made of the same material as and may be formed in one body with the roof layer 360. However, the partition structure is not limited thereto, and may be separately formed from the roof layer 360.

The structure of the above-described liquid crystal display according to an exemplary embodiment of the present disclosure is only one example and numerous variations may be possible. For example, the arrangement shape of the microcavities 305, the first region V1, and the second region V2 may be changed, and the plurality of roof layers 360 may be connected to each other in the first region V1. Also, the partition disposed in the second region V2 does not exist or partially exists such that a path connecting the microcavities 305 adjacent to each other based on the second region V2 may be formed.

Next, the liquid crystal display according to an exemplary embodiment of the present disclosure will be described with reference to FIG. 2 to FIG. 4.

Figure 2:
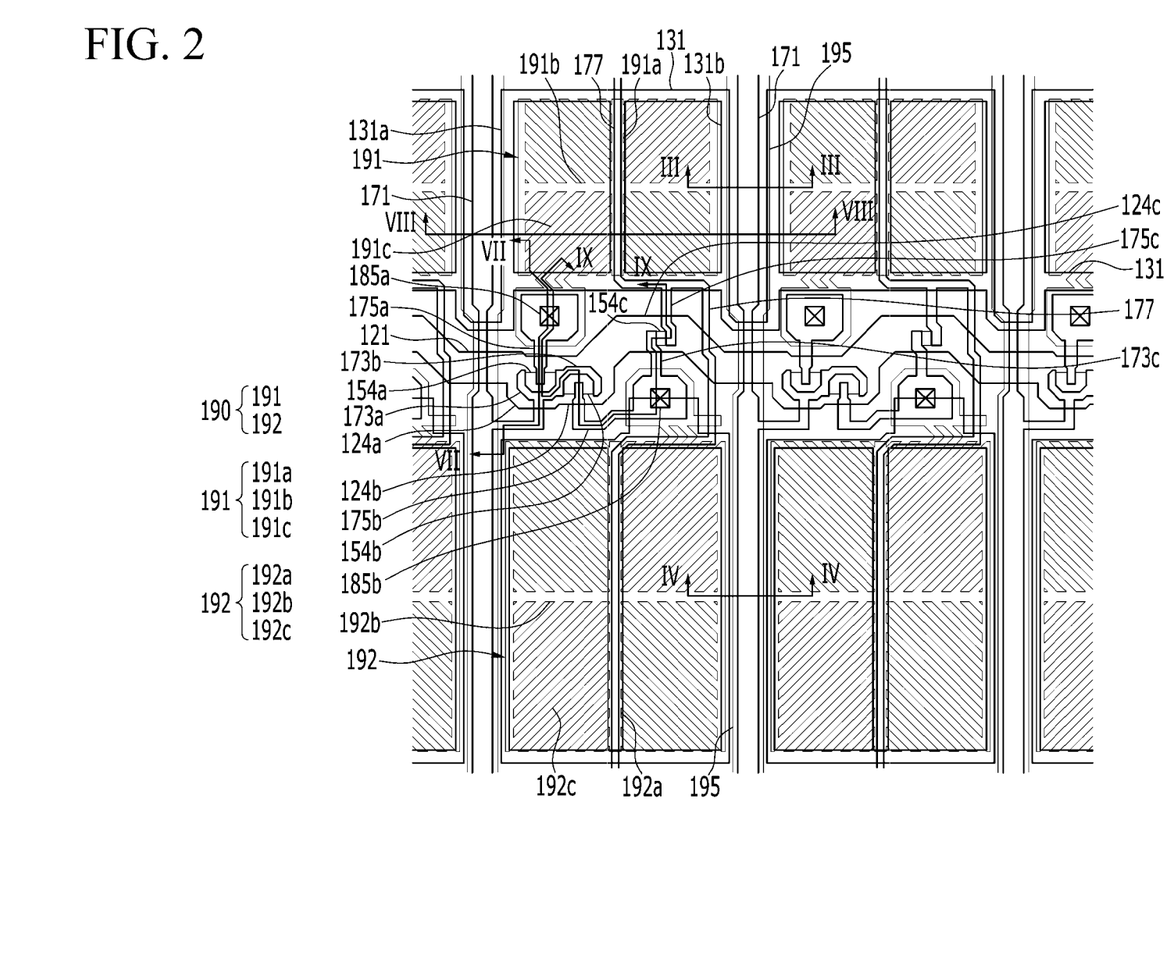
FIG. 2 is an enlarged view of a portion of FIG. 1.

FIG. 2 is an enlarged view of a portion of FIG. 1. FIG. 3 is a cross-sectional view taken along a line of FIG. 2. FIG. 4 is a cross-sectional view taken along a line IV-IV of FIG. 2.

FIG. 2 shows a two pixel areas arranged along the horizontal direction and this pixel area may be repeatedly arranged up, down, left, and right in the liquid crystal display according to an exemplary embodiment of the present disclosure.

Figure 3:
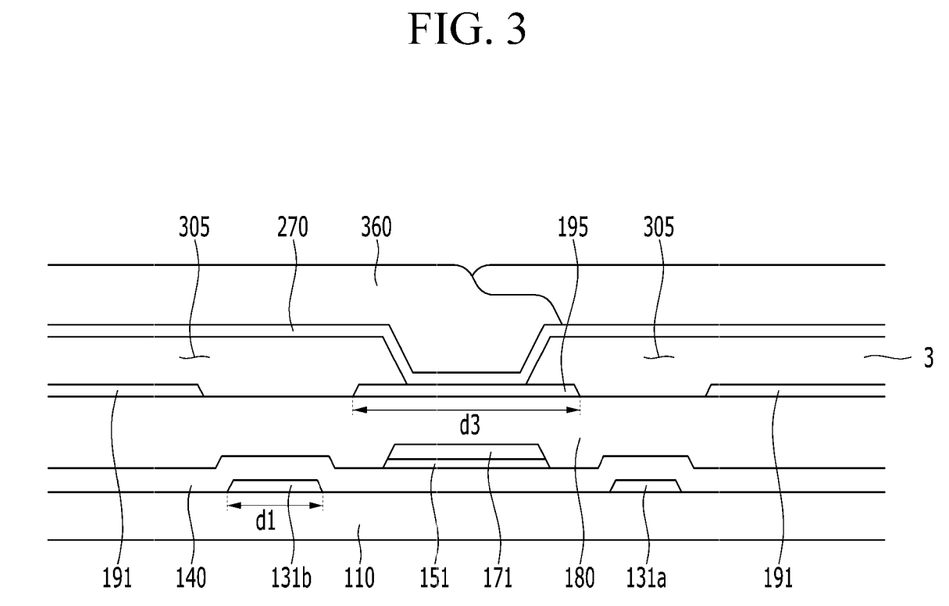
FIG. 3 is a cross-sectional view taken along a line III-III of FIG. 2.
Figure 4:
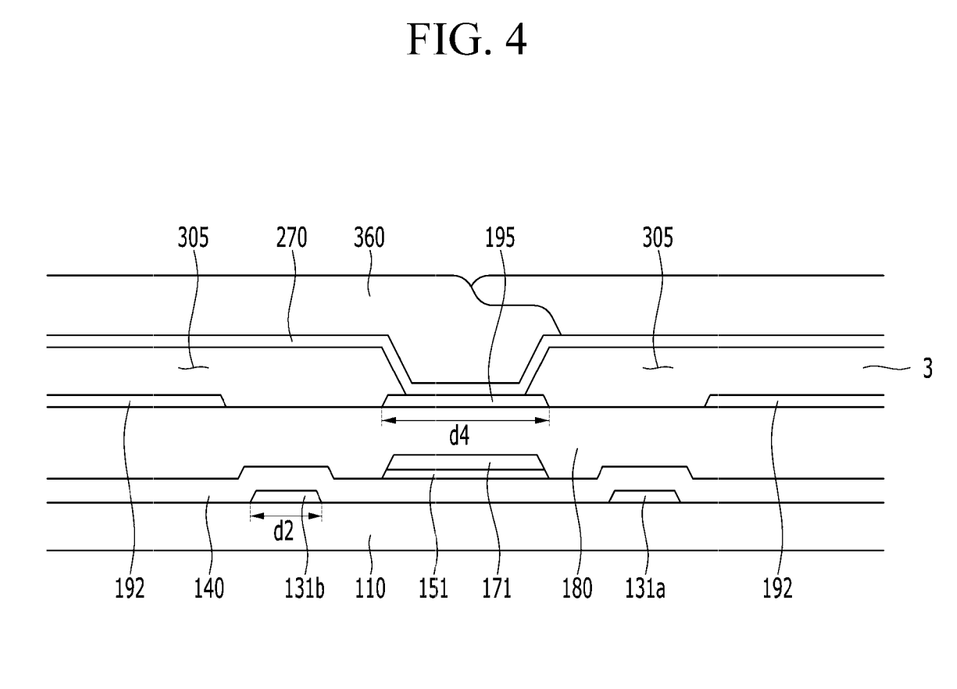
FIG. 4 is a cross-sectional view taken along a line IV-IV of FIG. 2.

Referring to FIG. 2 to FIG. 4, the liquid crystal display according to an exemplary embodiment of the present disclosure is disposed with a storage electrode line including a first storage electrode line 131a and a second storage electrode line 131b respectively disposed on a right side and a left side of a data line 171 on the substrate 110. The first and second storage electrode lines 131a and 131b may be connected to each other by a storage electrode 131 as shown in FIG. 2. The first and second storage electrode lines 131a and 131b may be disposed to be parallel to the data line 171.

In the present exemplary embodiment, a first width d1 of the second storage electrode line 131b disposed between a first sub-pixel electrode 191 which is a high pixel electrode and the data line 171 of an adjacent pixel column shown in FIG. 3 is larger than a second width d2 of the second storage electrode line 131b disposed between a second sub-pixel electrode 192 which is a low pixel electrode and the data line 171 of the adjacent pixel column shown in FIG. 4. The width of the first storage electrode line 131a disposed between the first sub-pixel electrode 191 and the data line 171 of a present pixel column and the width of the first storage electrode line 131a disposed between the second sub-pixel electrode 192 and the data line 171 of the present pixel column may be substantially the same as the second width d2.

A gate insulating layer 140 is disposed on the first and second storage electrode lines 131a and 131b, a semiconductor stripe layer 151 is disposed on the gate insulating layer 140, and the data line 171 is disposed on the semiconductor stripe layer 151.

A passivation layer 180 is disposed on the gate insulating layer 140 and the data line 171, and a pixel electrode 190 including the first sub-pixel electrode 191 and a second sub-pixel electrode 192 is disposed on the passivation layer 180. In the present exemplary embodiment, a shielding electrode 195 is disposed with the same layer as the first and second sub-pixel electrodes 191 and 192. The shielding electrode 195 is disposed to be separated from the first sub-pixel electrode 191 and the second sub-pixel electrode 192.

A common electrode 270 is disposed to face the first and second sub-pixel electrodes 191 and 192. The common electrode 270 may be made of a transparent conductive material such as ITO or IZO. The plurality of microcavities 305 are disposed between the first and second sub-pixel electrodes 191 and 192 and the common electrode 270, and a liquid crystal layer 3 is disposed in the plurality of microcavities 305. The liquid crystal layer 3 includes the liquid crystal material.

The roof layer 360 is disposed on the common electrode 270, and in the present exemplary embodiment, the roof layer 360 may be formed of a color filter. The roof layer 360 may be formed of a plurality of color filters, and each edge of the plurality of color filters may be overlapped on the portion corresponding to the data line 171. In order to form the microcavities 305 adjacent to each other, the roof layer 360 may have a portion that is protruded in the direction toward the substrate 110, and this protruded portion may form a partition PWP between adjacent microcavities 305. The partition PWP may be made of the same material as the roof layer 360 and may be formed in one body.

In the present exemplary embodiment, the common electrode 270 may directly contact one surface of the roof layer 360 and the partition PWP. Also, the common electrode 270 may contact the shielding electrode 195 while being disposed between the partition PWP and the shielding electrode 195.

In the present exemplary embodiment, a third width d3 of the shielding electrode 195 disposed to be adjacent to the first sub-pixel electrode 191 shown in FIG. 3 is larger than a fourth width d4 of the shielding electrode 195 disposed to be adjacent to the second sub-pixel electrode 192 shown in FIG. 4. As described above, since the first width d1 of the second storage electrode line 131b disposed between the first sub-pixel electrode 191 and the data line 171 of the adjacent pixel column is larger than the second width d2 of the second storage electrode line 131b disposed between the second sub-pixel electrode 192 and the data line 171 of the adjacent pixel column, the change of the liquid crystal capacitance which is caused by a misalignment of the pixel electrode 190 and/or the common electrode 270 may be optimally controlled.

In the present exemplary embodiment, it is preferable for the width of the shielding electrode 195 to be larger than the width of the common electrode 270 which contacts the shielding electrode 195. In the liquid crystal display in which the liquid crystal layer 3 is disposed in the plurality of microcavities 305, since the common electrode 270 extends from one surface of the roof layer 360 toward the liquid crystal layer 3 and is disposed along the side of the partition PWP which is protruded toward the liquid crystal layer 3, when the misalignment between the pixel electrode 190 and/or the common electrode 270 is occurred, the change of the liquid crystal capacitance may be increased. However, in the present exemplary embodiment, since the shielding electrode 195 connected to the common electrode 270 is disposed between adjacent pixel electrodes 190, the electric field between the common electrode 270 disposed on the side of the partition PWP and the pixel electrode 190 may be reduced. Accordingly, even if the misalignment of the pixel electrode 190 and/or the common electrode 270 is occurred, the change of the liquid crystal capacitance may be suppressed from being increased.

Figure 5:
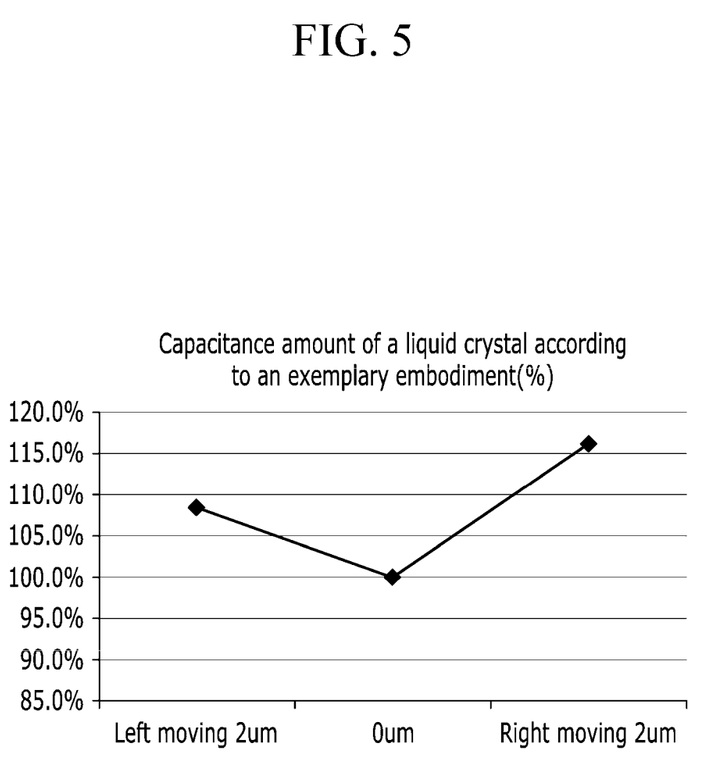
FIG. 5 is a graph showing a change of a liquid crystal capacitance according to a comparative example.
Figure 6:
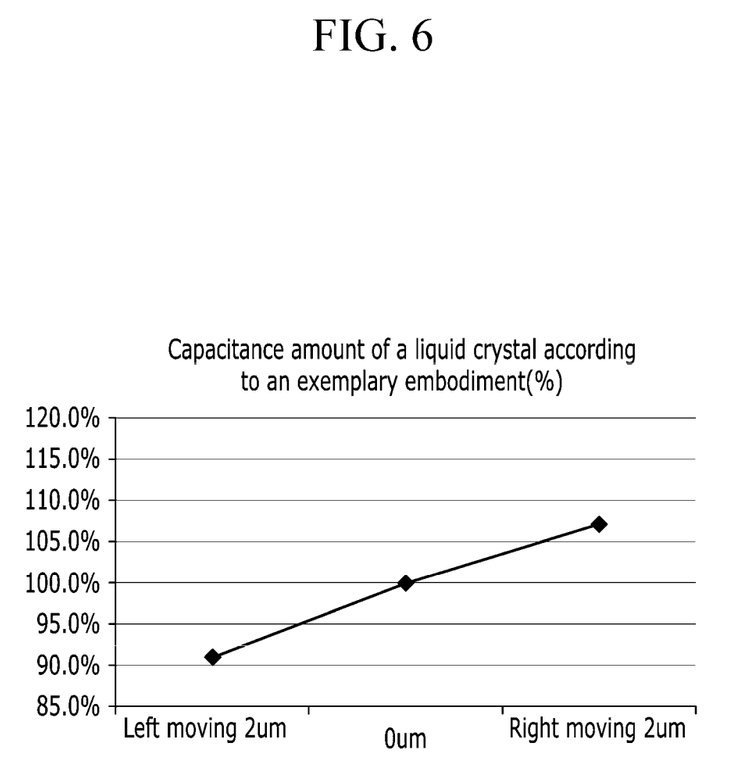
FIG. 6 is a graph showing a change of a liquid crystal capacitance in a liquid crystal display according to an exemplary embodiment of the present disclosure.

FIG. 5 is a graph showing a change of a liquid crystal capacitance according to a comparative example. FIG. 6 is a graph showing a change of a liquid crystal capacitance in a liquid crystal display according to an exemplary embodiment of the present disclosure. The comparative example of FIG. 5 shows the change of the liquid crystal capacitance when the pixel electrode is moved right or left by 2 μm with respect to the data line without the shielding electrode.

Referring to FIG. 5, when there is no shielding electrode, if the pixel electrode is moved in the left direction or the right direction with reference to the data line, an increased amount of the capacitance between a portion of the common electrode disposed on the lateral surface of the partition and the pixel electrode is larger than an decreased amount of the capacitance between a portion of the common electrode disposed on the lateral surface of the partition and the pixel electrode within a pixel.

Referring to FIG. 6, when the pixel electrode is moved left with respect to the data line 171, the overlapping area of the shielding electrode 195 and the underlying storage electrode line 131b is increased such that the capacitance between the common electrode disposed on the side of the partition and the pixel electrode is reduced, thereby reducing the liquid crystal capacitance. When the pixel electrode is moved right with respect to the data line, the overlapping area of the shielding electrode 195 and the storage electrode line 131a is increased such that the capacitance effect between the common electrode disposed on the lateral surface of the partition and the pixel electrode may be reduced, however the shielding electrode exists between adjacent pixel electrodes 190 such that the change of the liquid crystal capacitance may be reduced by about 10% compared with the comparative example. Here, since the shielding electrode is formed of the same material in the same process as the pixel electrode, the shielding electrode may be moved along the moving of the pixel electrode.

In the exemplary embodiment of FIG. 6, the misalignment of the pixel electrode is described, and since the capacitance is generated between the shielding electrode 195 and the pixel electrode 190 when the common electrode is moved to the right or the left with respect to the data line 171, the change of the liquid crystal capacitance depending on the capacitance effect between the common electrode disposed on the side of the partition and the pixel electrode may be reduced.

The liquid crystal display according to the present exemplary embodiment includes the shielding electrode between the adjacent pixel electrodes 195 such that the effect of the capacitance between the common electrode disposed on the side of the partition and the pixel electrode may be reduced.

Next, a thin film transistor structure and a pixel structure of the liquid crystal display according to an exemplary embodiment of the present disclosure will be described with reference to FIG. 2 and FIG. 7 to FIG. 9.

Figure 7:
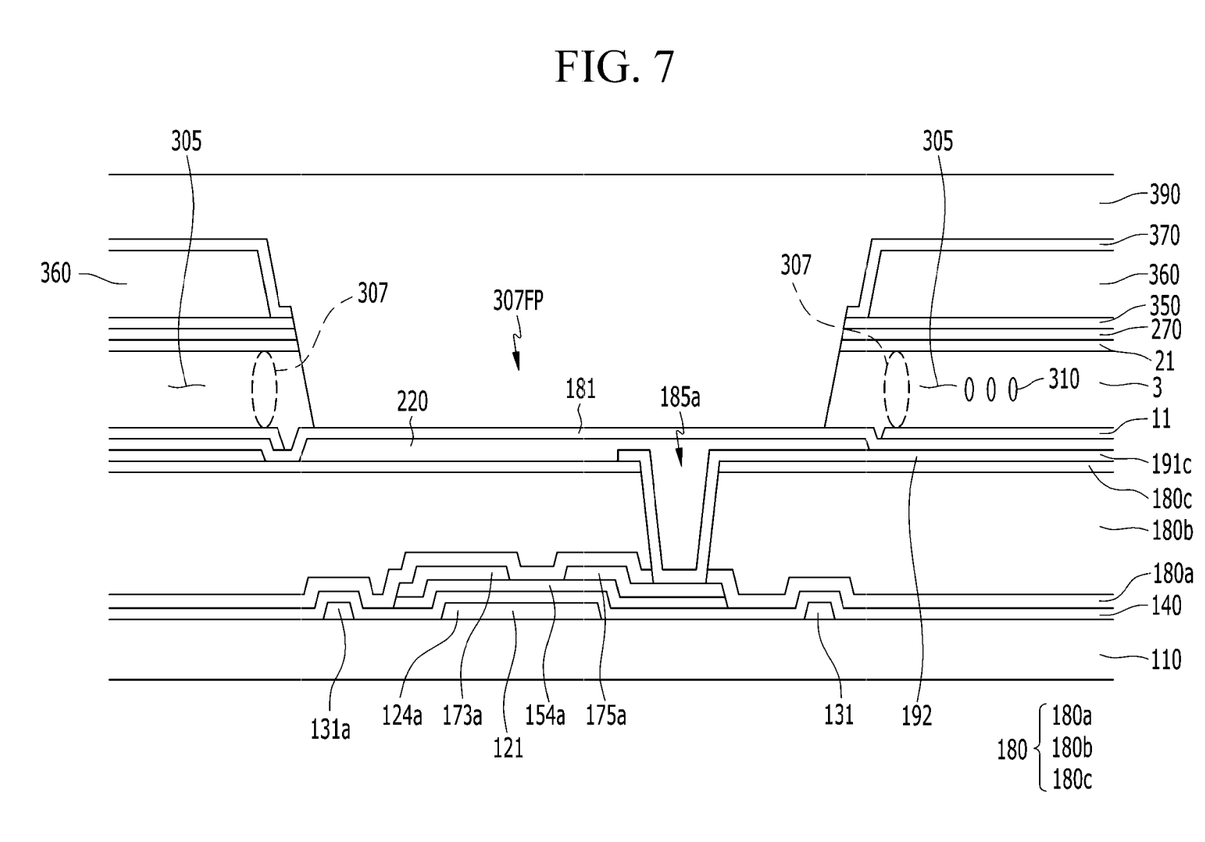
FIG. 7 is a cross-sectional view taken along a line VII-VII of FIG. 2.
Figure 8:
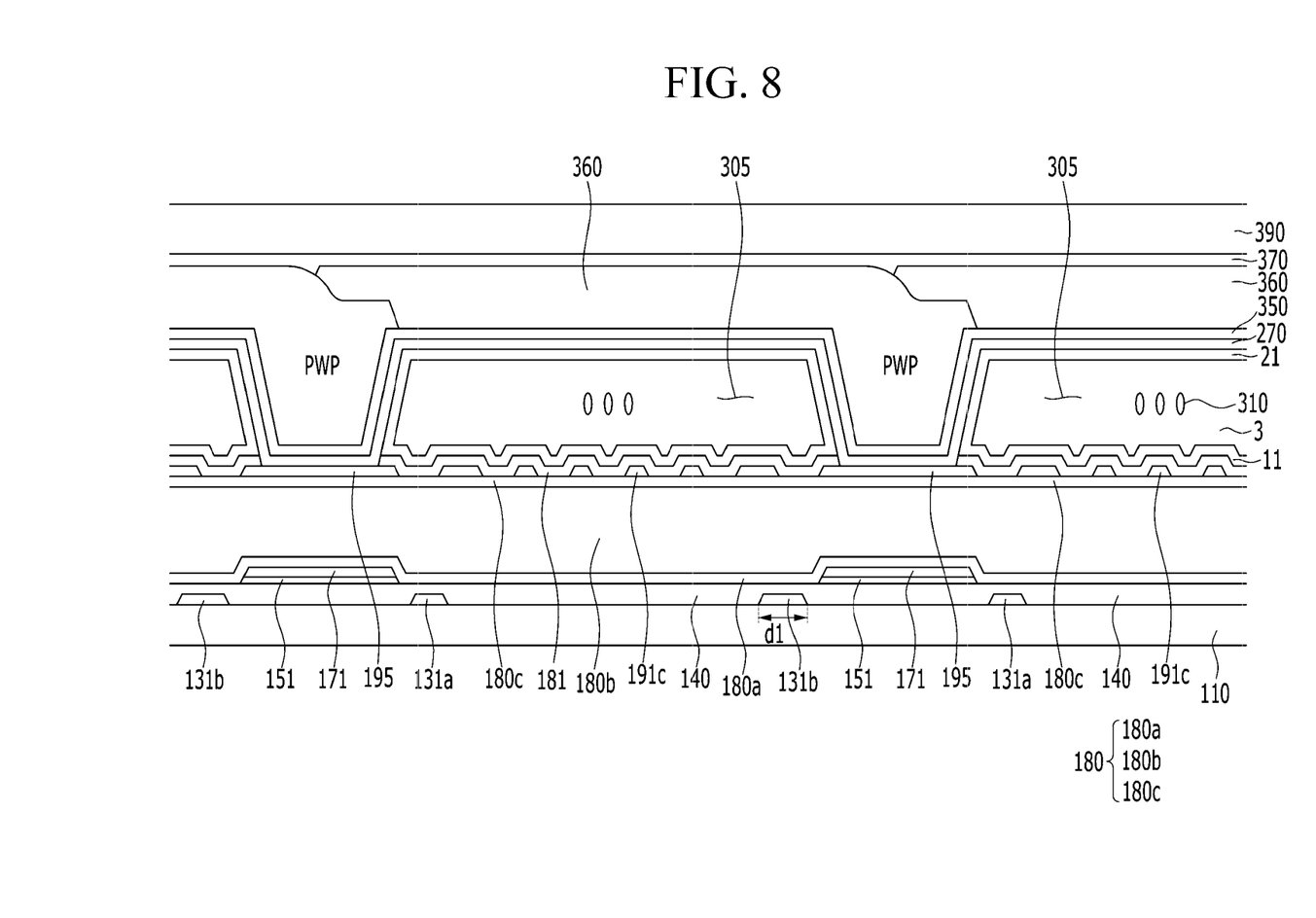
FIG. 8 is a cross-sectional view taken along a line VIII-VIII of FIG. 2.
Figure 9:
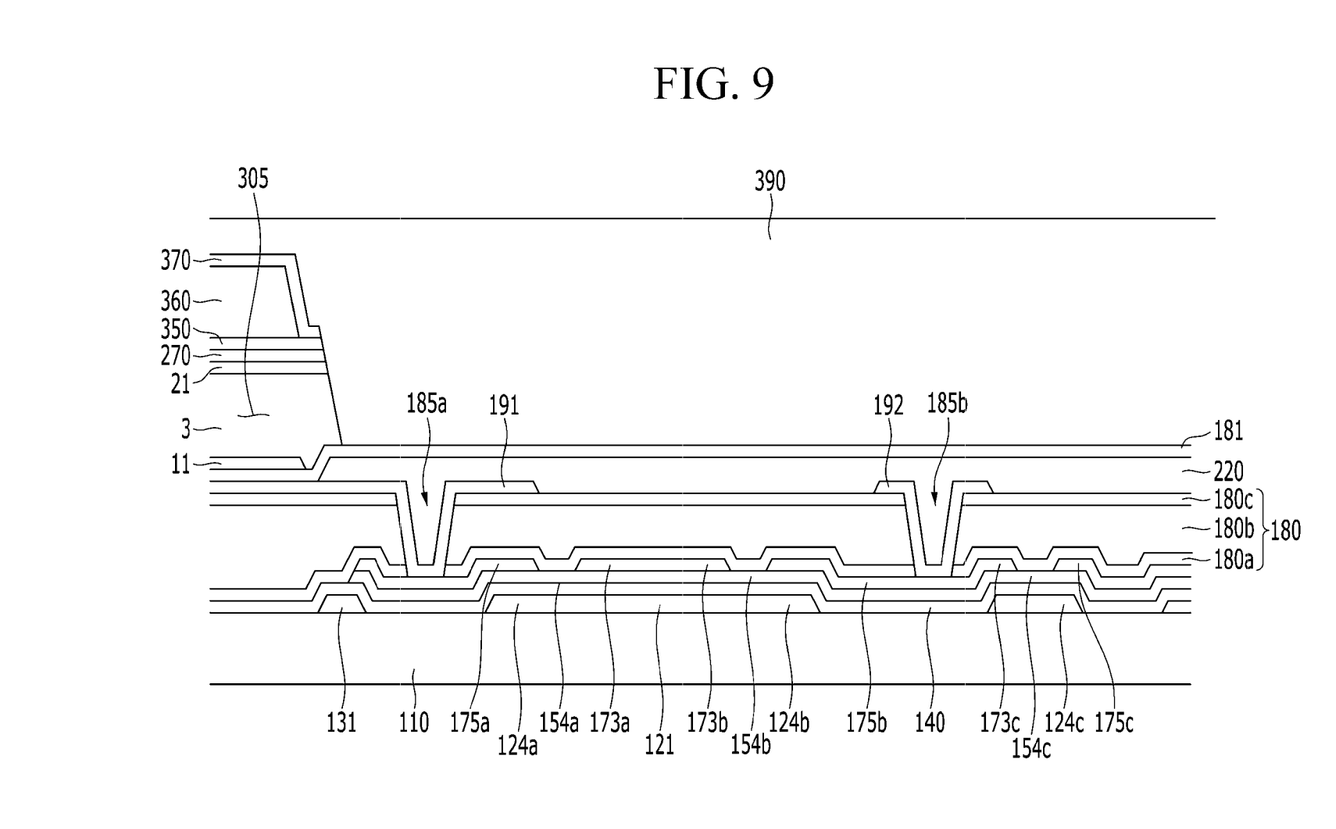
FIG. 9 is a cross-sectional view taken along a line IX-IX of FIG. 2.

FIG. 7 is a cross-sectional view taken along a line VII-VII of FIG. 2. FIG. 8 is a cross-sectional view taken along a line VIII-VIII of FIG. 2. FIG. 9 is a cross-sectional view taken along a line IX-IX of FIG. 2.

Referring to FIG. 2 and FIG. 7 to FIG. 9, a gate line 121, a first storage electrode line 131a, a second storage electrode line 131b, and a storage electrode 131 are formed on a substrate 110 made of transparent glass or plastic. The gate line 121 includes a first gate electrode 124a, a second gate electrode 124b, a third gate electrode 124c, and a wide end (not shown) for connection with other layers or an external driving circuit.

The gate line 121, the first storage electrode line 131a, the second storage electrode line 131b, and the storage electrode 131 may be formed of an aluminum-based metal such as aluminum (Al) or an aluminum alloy, a silver-based metal such as silver (Ag) or a silver alloy, a copper-based metal such a copper (Cu) or a copper alloy, a molybdenum-based metal such as molybdenum (Mo) or a molybdenum alloy, chromium (Cr), tantalum (Ta), and titanium (Ti). The gate line 121 may have a multilayer structure which includes at least two conductive layers having different physical properties.

The first storage electrode line 131a and the second storage electrode line 131b are respectively disposed between the pixel electrode 190 and the data line 171. The first storage electrode line 131a and the second storage electrode line 131b may reduce signal interference between the pixel electrode 190 and the data line 171, and the storage electrode 131 may reduce signal interference between the pixel electrode 190 and the gate line 121.

The storage electrode 131 and the first and second storage electrode lines 131a and 131b are applied with a predetermined voltage such as a common voltage. The storage electrode 131 and the first and second storage electrode lines 131a and 131b have a structure enclosing the first sub-pixel electrode 191 and the second sub-pixel electrode 192 that are described later. In the present exemplary embodiment, the first width d1 of the second storage electrode line 131b disposed between the first sub-pixel electrode 191 and the data line 171 of the adjacent pixel column may be larger than the width of the first storage electrode line 131a disposed between the first sub-pixel electrode 191 and the data line 171 of the present pixel column. Also, the first width d1 of the second storage electrode line 131b disposed between the first sub-pixel electrode 191 and the data line 171 of the adjacent pixel column may be larger than the width of the second storage electrode line 131b disposed between the second sub-pixel electrode 192 and the data line 171 of the adjacent pixel column. The width of the first storage electrode line 131a disposed between the second sub-pixel electrode 192 and the data line 171 of the present pixel column and the width of the second storage electrode line 131b disposed between the second sub-pixel electrode 192 and the data line 171 is substantially the same as the width of the first storage electrode line 131a disposed between the first sub-pixel electrode 191 and the data line 171 of the present pixel column.

A gate insulating layer 140 is disposed on the gate line 121. The gate insulating layer 140 may be made of a silicon nitride (SiNx) or a silicon oxide (SiOx). The gate insulating layer 140 may be made of a multilayer structure including at least two insulating layers having different physical properties. A first semiconductor layer 154a, a second semiconductor layer 154b, a third semiconductor layer 154c, and a semiconductor stripe layer 151 are disposed on the gate insulating layer 140. Each of the first semiconductor layer 154a, the second semiconductor layer 154b, and the third semiconductor layer 154c may include a channel region. The semiconductor stripe layer 151 may be disposed under a data line 171 that is described later. A plurality of ohmic contacts (not shown) may be disposed on the first semiconductor layer 154a, the second semiconductor layer 154b, and the third semiconductor layer 154c.

The second semiconductor layer 154b, and the third semiconductor layer 154c, a data conductor including a first source electrode 173a, a second source electrode 173b, a third source electrode 173c, a first drain electrode 175a, a second drain electrode 175b, a third drain electrode 175c, a data line 171 connected to the first source electrode 173a, and a reference voltage line 177 connected to the third drain electrode 175c is disposed on the first semiconductor layer 154a.

The data conductor and the underlying semiconductor layer may be simultaneously formed by using one mask.

The data line 171 includes a wide end (not shown) for connection with other layers or an external driving circuit. The data line 171 may function as a light blocking member.

The data conductor is preferably made of a refractory metal such as copper, molybdenum, chromium, tantalum, and titanium, or alloys thereof, and may have a multilayer structure include the refractory metal layer (not shown) and a low resistance conductive layer (not shown).

The reference voltage line 177 is directly connected to the third drain electrode 175c, and may be disposed while overlapping longitudinal stems 191a and 192a of the pixel electrode 190 that is described later. The reference voltage line 177 is disposed to overlap the longitudinal stems 191a and 192a, thereby preventing a reduction of the aperture ratio. A level of the voltage applied to the reference voltage line 177 may be higher than the level of the common voltage applied to the common electrode.

The first gate electrode 124a, the first source electrode 173a, and the first drain electrode 175a form a first thin film transistor along with the first semiconductor layer 154a, and the channel region of the thin film transistor is formed in the portion of the first semiconductor layer 154a between the first source electrode 173a and the first drain electrode 175a. Similarly, the second gate electrode 124b, the second source electrode 173b, and the second drain electrode 175b form a second thin film transistor along with the second semiconductor 154b and the channel region of the thin film transistor is formed in the portion of the semiconductor portion 154b between the second source electrode 173b and the second drain electrode 175b, and the third gate electrode 124c, the third source electrode 173c, and the third drain electrode 175c form a third thin film transistor along with the third semiconductor 154c and the channel region of the thin film transistor is formed in the portion of the semiconductor portion 154c between the third source electrode 173c and the third drain electrode 175c.

A passivation layer 180 is disposed on the data conductor and the portion of the semiconductor layers 154a, 154b, and 154c formed with the channel region. The passivation layer 180 includes a first passivation layer 180a, a second passivation layer 180b, and a third passivation layer 180c.

The first passivation layer 180a may include the inorganic material such as a silicon nitride (SiNx) and a silicon oxide (SiOx). The second passivation layer 180b and the third passivation layer 180c may be disposed on the first passivation layer 180a. The second passivation layer 180b may include the organic material, and the third passivation layer 180c may include the inorganic material such as a silicon nitride (SiNx) and a silicon oxide (SiOx). As one example of the second passivation layer 180b, the second passivation layer 180b is made of the organic material, thereby substantially flattening the surface having a step. Differently from the present exemplary embodiment, one or two among the first passivation layer 180a, the second passivation layer 180b, and the third passivation layer 180c may be omitted.

The passivation layer 180 has contact holes 185a and 185b exposing the first drain electrode 175a and the second drain electrode 175b.

The pixel electrode 190 including the first sub-pixel electrode 191 and the second sub-pixel electrode 192 is disposed on the passivation layer 180. The pixel electrode 190 may be made of the transparent conductive material such as ITO or IZO. The shielding electrode 195 is disposed on the portion overlapping the data line 171 on the passivation layer 180. The shielding electrode 195 may be formed of the same material as the pixel electrode 190. Also, the shielding electrode 195 may be disposed with the same layer as the pixel electrode 190. The shielding electrode 195 includes a first shielding electrode disposed on the portion adjacent to the first sub-pixel electrode 191 and a second shielding electrode disposed on the portion adjacent to the second sub-pixel electrode 192, and the width of the first shielding electrode and the width of the second shielding electrode may be different from each other. In this case, the width of the first shielding electrode may be larger than the width of the second shielding electrode.

The first sub-pixel electrode 191 and the second sub-pixel electrode 192 are adjacent in the vertical direction as shown in FIG. 2, and the entire shape is a quadrangle. The first sub-pixel electrode 191 and the second sub-pixel electrode 192 respectively include a crossed stem including longitudinal stems 191a and 192a and transverse stems 191b and 192b crossing the longitudinal stems 191a and 192a. Also, the pixel is divided into four sub-regions by the transverse stems 191b and 192b and the longitudinal stems 191a and 192a, and each sub-region includes a plurality of minute branches 191c and 192c.

The first sub-pixel electrode 191 and the second sub-pixel electrode 192 are physically and electrically connected to the first drain electrode 175a and the second drain electrode 175b through contact holes 185a and 185b, thereby receiving the data voltage from the first drain electrode 175a and the second drain electrode 175b. In this case, some of the data voltage applied to the second drain electrode 175b is divided through the third drain electrode 175c, and thus the voltage applied to the second subpixel electrode 190b is smaller than that of the voltage applied to the first subpixel electrode 190a.

However, the area of the second sub-pixel electrode 192 may be more than one time to less than two times the area of the first sub-pixel electrode 191. In an exemplary embodiment of the present disclosure, it is preferable that the area of the second sub-pixel electrode 192 may be more than 1 time to less than 1.5 times the area of the first sub-pixel electrode 191.

The description of the above-described thin film transistor and the pixel electrode 190 is only one example, and the structure of the thin film transistor and the design of the pixel electrode may be changed to improve the lateral visibility.

A light blocking member 220 covering the region in which the thin film transistor is formed is disposed on the pixel electrode 190. The light blocking member 220 according to the present exemplary embodiment may be formed along the direction in which the gate line 121 extends. The light blocking member 220 may be made of the material blocking the light.

A fourth passivation layer 181 may be disposed on the light blocking member 220, and the fourth passivation layer 181 may cover the light blocking member 220 and extend on the pixel electrode 190. As shown in FIG. 8, the fourth passivation layer 181 may not exist on the portion corresponding to the data line 171 such that a common electrode 270 that is described later and the shielding electrode 195 may be in contact. The fourth passivation layer 181 may be omitted.

A lower alignment layer 11 is formed on the pixel electrode 190, and the lower alignment layer 11 may be a vertical alignment layer. The lower alignment layer 11, which is a liquid crystal alignment layer, such as polyamic acid, polysiloxane, or polyimide, may be formed of any one among generally-used materials. Also, the lower alignment layer 11 may be a photo-alignment layer.

An upper alignment layer 21 is disposed at a portion facing the lower alignment layer 11, and a microcavity 305 is formed between the lower alignment layer 11 and the upper alignment layer 21. The liquid crystal material including liquid crystal molecules 310 is injected into the microcavity 305, and as shown in FIG. 7, the inlet parts 307 are disposed near both edges of the microcavities 305. The inlet part 307 is a portion corresponding to the boundary of the trench region 307FP covered by a capping layer 390 that is described later and the microcavities 305. The alignment material and/or the liquid crystal material may be injected to the microcavities 305 through the inlet part 307. In the present exemplary embodiment, the alignment material for the alignment layers 11 and 21 and the liquid crystal material including the liquid crystal molecules 310 may be injected into the microcavities 305 by using a capillary force.

As the microcavities 305 are divided in the vertical direction by the trench region 307FP disposed at the portion overlapping the gate line 121 to form the plurality of microcavities 305, the plurality of microcavities 305 may be formed along the column direction of the pixel electrode 190, in other words, the vertical direction. Also, the microcavity 305 is divided in the horizontal direction by a partition portion PWP that will be described later, thereby forming the plurality of microcavities 305, and a plurality of microcavities 305 may be formed along the row direction of the pixel electrode 191, in other words, the horizontal direction in which the gate line 121 extends. Each of the plurality of microcavities 305 may correspond to each of the pixel areas or two or more pixel areas, and the pixel areas may correspond to the image display area.

The common electrode 270 and a lower insulating layer 350 are disposed on the upper alignment layer 21. The common electrode 270 receives the common voltage, and generates an electric field together with the pixel electrode 191 to which the data voltage is applied to determine a direction in which the liquid crystal molecules 310 disposed at the microcavity 305 between the two electrodes are inclined. The common electrode 270 forms a capacitor with the pixel electrode 191 to maintain the received voltage even after the thin film transistor is turned off. The lower insulating layer 350 may be formed of a silicon nitride (SiNx) or a silicon oxide (SiOx).

In the present exemplary embodiment, it is described that the common electrode 270 is disposed on the microcavities 305, but in another exemplary embodiment, the common electrode 270 is formed under the microcavities 305, so that liquid crystal driving according to a coplanar electrode (CE) mode is possible.

A roof layer 360 is disposed on the lower insulating layer 350. In the present exemplary embodiment, the roof layer 360 may be made of a color filter. As shown in FIG. 8, among the adjacent color filters, the color filter of one color may form the partition PWP. The partition PWP is disposed between the microcavities 305 adjacent in the horizontal direction. The partition PWP is a portion where the separated space of the microcavities 305 adjacent in the horizontal direction is filled. The partition PWP may be formed along the direction that the data line 171 extends.

In the present exemplary embodiment, the common electrode 270 may be disposed along one surface of the roof layer 360 and the partition PWP protruded toward the liquid crystal layer 3. Also, the common electrode 270 may be disposed between the lower surface of the partition PWP and the shielding electrode 195. In this case, the common electrode 270 and the shielding electrode 195 may be in contact. It is preferable that the width of the common electrode 270 contacting the shielding electrode 195 is larger than the width of the shielding electrode 195. In this case, the width of the common electrode 270 and the width of the shielding electrode 195 may be a distance of the common electrode 270 and the shielding electrode 195 in the direction substantially vertical to the direction that the data line 171 extends, as shown in FIG. 2 and FIG. 8.

The roof layer 360 that may be made of the plurality of color filters may have the structure in which the plurality of color filters overlaps on the edge portions over the partition PWP. The interface where the adjacent color filters meet may be disposed on the portion corresponding to the partition PWP.

In the present exemplary embodiment, the color filters 360 and the partition wall part PWP serve to support the microcavities 305 so that the microcavities 305 may maintain their shapes.

An upper insulating layer 370 is disposed on the roof layer 360. The upper insulating layer 370 may be made of a silicon nitride (SiNx) or a silicon oxide (SiOx). As shown in FIG. 7, the side of the roof layer 360 may be covered by the upper insulating layer 370.

A capping layer 390 is disposed on the upper insulating layer 370. The capping layer 390 is also disposed in a trench region 307FP and covers the inlet part 307 of the microcavities 305 exposed by the trench region 307FP. The capping layer 390 includes the organic material or the inorganic material. Here, the liquid crystal material is removed in the trench region 307FP, however the liquid crystal material that remains after being injected to the microcavities 305 may remain in the trench region 307FP.

In the present exemplary embodiment, the partition PWP is disposed between the microcavities 305 such that the generated stress may be reduced although the substrate 110 is bent and the degree that the cell gap is changed may be reduced.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a substrate;
a pixel electrode disposed on the substrate;
a roof layer overlapping the pixel electrode;
a liquid crystal layer disposed in a plurality of microcavities between the pixel electrode and the roof layer;
a partition disposed between adjacent microcavities among the plurality of microcavities; and
a shielding electrode disposed between the substrate and the partition,
wherein the shielding electrode is disposed on the same layer as the pixel electrode, and
wherein the pixel electrode comprises a first sub-pixel electrode and a second sub-pixel electrode, the shielding electrode comprises a first shielding electrode adjacent to the first sub-pixel electrode and a second shielding electrode adjacent to the second sub-pixel electrode, and a width of the first shielding electrode is different from a width of the second shielding electrode.

2. The liquid crystal display of claim 1, further comprising a common electrode disposed along one surface of the roof layer and the partition protruded toward the liquid crystal layer.

3. The liquid crystal display of claim 2, wherein the common electrode is disposed between a lower surface of the partition and the shielding electrode.

4. The liquid crystal display of claim 3, wherein the common electrode contacts the shielding electrode.

5. The liquid crystal display of claim 4, wherein the width of the shielding electrode is larger than the width of the common electrode contacting the shielding electrode.

6. The liquid crystal display of claim 1, wherein the partition comprises the same material as the roof layer.

7. The liquid crystal display of claim 1, wherein the partition comprises a color filter.

8. The liquid crystal display of claim 1, further comprising:
a data line disposed on the substrate; and
a first storage electrode line and a second storage electrode line disposed on a left side and a right side of the data line, respectively,
wherein the widths of the first storage electrode line and the second storage electrode line are different from each other.

9. A liquid crystal display comprising:
a substrate;
a roof layer facing the substrate;
a liquid crystal layer disposed in a plurality of microcavities between the substrate and the roof layer;
a partition disposed between adjacent microcavities among the plurality of microcavities; and
a shielding electrode disposed between the substrate and the partition,
wherein a width of the shielding electrode is larger than a width of the lower surface of the partition.

10. The liquid crystal display of claim 9, further comprising a common electrode disposed along one surface of the roof layer and the partition protruded toward the liquid crystal layer.

11. The liquid crystal display of claim 10, wherein the common electrode is disposed between the lower surface of the partition and the shielding electrode.

12. The liquid crystal display of claim 11, wherein: the common electrode contacts the shielding electrode.

13. The liquid crystal display of claim 12, wherein the width of the shielding electrode is larger than the width of the common electrode contacting the shielding electrode.

14. The liquid crystal display of claim 9, wherein the partition comprises the same material as the roof layer.

15. The liquid crystal display of claim 9, wherein the partition comprises a color filter.

16. The liquid crystal display of claim 9, further comprising
a pixel electrode disposed on the substrate and including a first sub-pixel electrode and a second sub-pixel electrode,
the shielding electrode comprises a first shielding electrode adjacent to the first sub-pixel electrode and a second shielding electrode adjacent to the second sub-pixel electrode, and
the width of the first shielding electrode and the width of the second shielding electrode are different.

17. The liquid crystal display of claim 9, further comprising
a pixel electrode disposed on the substrate,
wherein the shielding electrode is disposed on the same layer as the pixel electrode.

18. The liquid crystal display of claim 9, further comprising:
a data line disposed on the substrate; and
a first storage electrode line and a second storage electrode line disposed on a left side and a right side of the data line, respectively,
wherein the widths of the first storage electrode line and the second storage electrode line are different.

* * * * *